April 7, 1931.  M. COLEMAN  1,799,887

FRUIT PICKER

Filed May 3, 1929

Morris Coleman Inventor

By [signature]

Attorney

Patented Apr. 7, 1931

1,799,887

UNITED STATES PATENT OFFICE

MORRIS COLEMAN, OF LYNN, MASSACHUSETTS

FRUIT PICKER

Application filed May 3, 1929. Serial No. 360,030.

My invention relates to fruit pickers of the type adaptable to gather fruit from trees while standing adjacent thereto.

The objects of my invention are to provide an easy and convenient means for efficient fruit picking; to avoid injury to fruit and to fruit trees; to eliminate the need and use of ladders; to minimize muscular exertion in fruit picking; to enable fruit to be reached in the most inaccessible places; to provide an offset handle designed to furnish the operator a full and unobstructed vision of the fruit to be picked; to provide a collapsible tube adaptable to convey the fruit as picked to a basket or other receptacle; to provide improved means for severing the fruit from the branches of the tree while the body of the picker is stationary; to provide an improved cutting down blade; to provide improved means for giving said blade a smooth cutting and return movement; and to provide the various other advantages and results made evident from the following specification.

Figure 1:
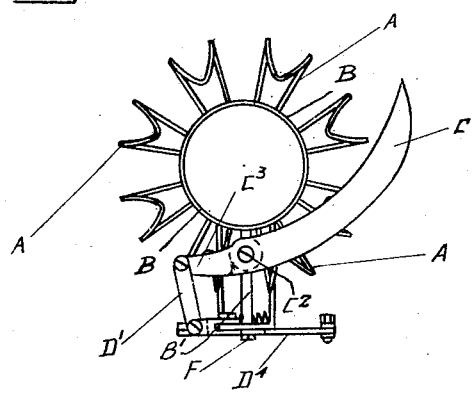
Figure 2:
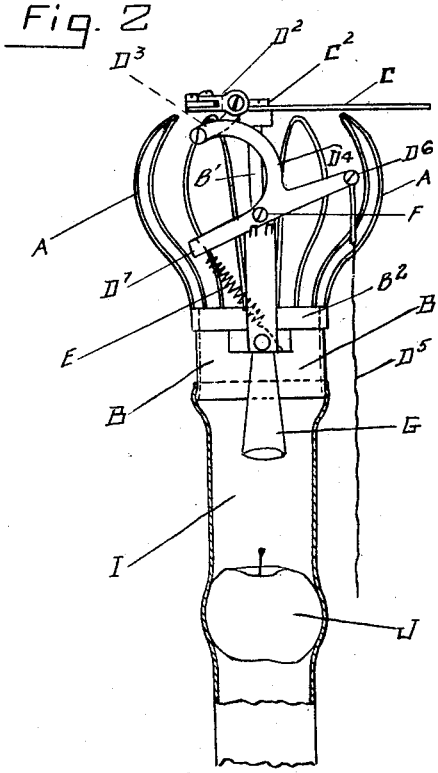
Figure 3:
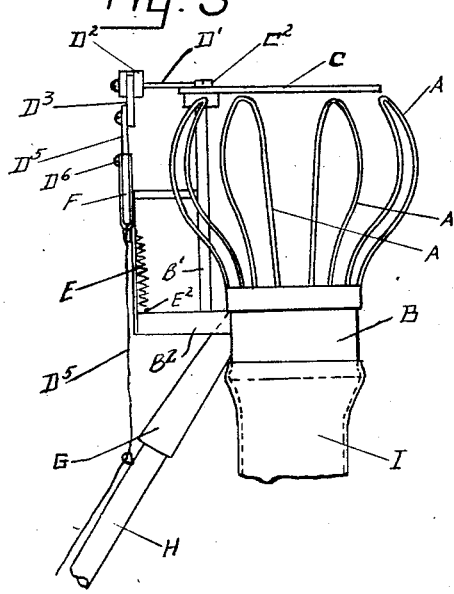

I accomplish the objects of my invention as shown in the accompanying drawings in which Figure 1 shows a top view of my device. Figure 2 shows a rear view and Figure 3 shows a side view thereof.

Referring again to Figures 1, 2, and 3, A shows a series of wire fingers comprising a gathering bowl formed about the ring B. C shows a blade pivotally mounted at $C^2$ upon the upper end of a standard $B^1$ rising from a support $B^2$ which extends laterally from the ring B, so as to swing horizontally back and forth over the gathering bowl formed by the wire fingers A. $D^1$ shows a connecting rod forming the first unit in the power line extending from the control end $C^3$. $D^2$ shows the second unit in said power line. $D^3$ is the third unit in said line. $D^4$ is the fourth unit and $D^5$ is the string, or optionally a chain, attached to one of the leverage arms $D^6$ of the unit $D^4$. To the opposite end $D^7$ of the unit $D^4$ is secured one end of a spring E the other end of which is secured to the support $B^2$ as at $E^2$. The unit $D^4$ is pivotally mounted at F so that its arms $D^6$ and $D^7$ swing vertically up and down. The units $D^1$, $D^2$, $D^3$, $D^4$, and $D^5$ are movably joined end to end so as to function in concert and furnish movement to the blade C. A pull on the string $D^5$ gives motion to the blade C in one direction and, as the pull is released, the spring E gives motion to the blade in the opposite direction. G shows a handle socket preferably integral with the ring B. H shows the handle, and this may be as long as required. I shows the tube or chute preferably of knit composition so as to slightly grip the fruit J as it passes therethrough to thus impede the gravity force. The tube I is adapted to extend to a basket or other receptacle as required. Similar letters of reference refer to similar parts throughout the various views.

While I have illustrated and described a preferred construction for carrying my invention into effect, this is capable of variation or modification without departing from the spirit of the invention. I therefore do not wish to be limited to the exact details of construction herein set forth but desire to avail myself of such variations and modifications as come within the scope of the appended claims.

Having thus described my invention I claim as new and desire to secure by Letters Patent of the United States of America:

1. A fruit picker comprising a handle, a knife supported by said handle for pivotal movement in a substantially horizontal plane, an intermediately pivoted lever carried by said handle for swinging movement in a substantially vertical plane, a pair of links pivotally connected with one another and with said knife and one end of said lever, respectively, and means connected with the other end of said lever for actuating same to effect pivotal movement of said knife.

2. A fruit picker comprising a handle, a ring carried by said handle, a chute carried by and depending from said ring, fingers extending upwardly from said ring forming a bowl to receive the fruit, a support extending laterally from said ring, a standard rising from said support, a knife pivotally mounted on the upper end of the said standard for horizontal swinging movement across the top of said bowl to sever the stem of a piece of fruit disposed within the bowl, and means for actuating said knife.

3. A fruit picker comprising a handle, a ring carried by said handle, a chute carried by and depending from said ring, fingers extending upwardly from said ring forming a bowl to receive the fruit, a support extending laterally from said ring, a standard rising from said support, a knife pivotally mounted on the upper end of said standard for horizontal swinging movement across the top of said bowl to sever the stem of a piece of fruit disposed within the bowl, a bell-crank lever pivoted at the side of said bowl for swinging movement in a vertical plane, a pair of links pivotally connected with one another and with said knife and one arm of said lever, respectively, yieldable means co-operating with said lever to maintain said knife in a normal position, and means connected with said lever for swinging the same to impart fruit severing movement to said knife.

In testimony whereof I affix my signature.

MORRIS COLEMAN.